Patented Mar. 3, 1942

2,275,383

UNITED STATES PATENT OFFICE 2,275,383

COMPOSITION OF MATTER AND METHOD OF MAKING SAME

Frank J. Soday, Swarthmore, Pa., assignor to The United Gas Improvement Company, a corporation of Pennsylvania No Drawing. Application February 6, 1940, Serial No. 317,529

13 Claims. (Cl. 260—468)

The present invention relates to new compositions of matter and to methods for their preparation.

More particularly, this invention pertains to alkyl esters of 4-methyl-Δ4-tetrahydrophthalic acid and its anhydride, and processes for the preparation of these new esters.

This invention is based upon the discovery that esters possessing very valuable properties can be obtained by the reaction of alcohols with 4-methyl-Δ4-tetrahydrophthalic acid, its anhydride, or other derivative or with mixtures containing the acid, the anhydride, and/or other derivative.

In my earlier copending application filed December 21, 1938, Serial Number 246,997 I have disclosed and claimed the butyl esters of 4-methyl-Δ4-tetrahydrophthalic acid. The instant application extends my disclosed and claimed subject-matter to the alkyl esters, broadly, of this acid and hence constitutes a continuation-in-part of my said prior application.

4-methyl-Δ4-tetrahydrophthalic acid is an isoprene derivative having the following general formula:

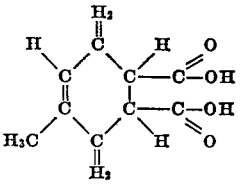

Its anhydride, 4-methyl-Δ4-tetrahydrophthalic anhydride, having the following structural formula:

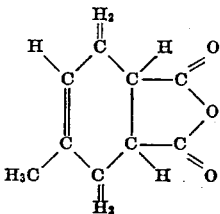

is the equivalent of the acid in the preparation of the esters disclosed herein.

It is an object of the present invention to provide as new compositions of matter, alkyl esters of 4-methyl-Δ4-tetrahydrophthalic acid and processes for their preparation and purification. More specifically, it is an object of the invention to provide new organic compounds comprising fluids which are essentially colorless and odorless and which are suitable for use alone or in combination with other substances as plasticizers in the formulation of lacquers, particularly those lacquers containing cellulose esters. Still another object is the provision of new compounds particularly valuable as plasticizers for synthetic and natural resins and plastics in general. A still further object of the invention is to provide new compounds which may be used as chemical intermediates in chemical synthesis. Another object is the provision of a process for effecting reactions between 4-methyl-Δ4-tetrahydrophthalic acid, its anhydrides and/or its derivatives with various alcohols, mixtures and derivatives of these alcohols. Other objects and advantages of the invention will be apparent to those skilled in the art from the following description.

4-methyl-Δ4-tetrahydrophthalic acid or its anhydride may be obtained in a number of ways. For example, the anhydride may be prepared through the reaction of isoprene with maleic anhydride. This reaction may be illustrated structurally as follows:

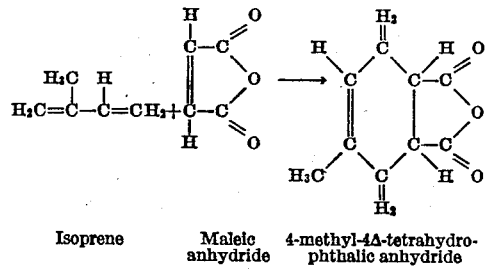

Isoprene    Maleic anhydride    4-methyl-4Δ-tetrahydrophthalic anhydride

The anhydride may be readily hydrolyzed to form the corresponding acid, 4-methyl-Δ4-tetrahydrophthalic acid, for instance, by mixture with water.

Illustrative of the reaction by which 4-methyl-Δ4-tetrahydrophthalic anhydride may be prepared is the example given below as Example A.

Isoprene, or hydrocarbon fractions containing any portion of isoprene may be used to react with maleic anhydride. The isoprene may be obtained synthetically, by the pyrolysis of rubber, or from fractions obtained by condensation in the manufacture of carburetted water gas, oil gas, refinery gas, or coke oven gas, or from similar sources. Such fractions will be referred to herein generally as light oil fractions.

For example, a sample or light oil obtained in the manufacture of oil gas under certain conditions, may be fractionated to obtain a cut containing say from 30 to 90% isoprene, in addition to various quantities of other unsaturated hydrocarbons. Cyclopentadiene and perhaps similar unsaturated hydrocarbons which may be present in an isoprene fraction may, if desired, be removed among other ways by heating the material, say at 100° C. in a closed vessel for several hours, followed by the distillation of the unchanged isoprene from the polymers thus formed. Piperylene may also be present. While a concenration of isoprene of at least 30% is preferred, lower concentrations may be employed.

The isoprene or isoprene fraction may be reacted with maleic anhydride or maleic acid or mixtures of these to produce 4-methyl-Δ4-tetrahydrophthalic anhydride by warming a mixture of the reagents. The reactants may be mixed say in substantially molar quantitities and allowed to react at room temperatures or at elevated temperatures until substantially complete conversion has been obtained.

A preferred embodiment of effecting the reaction is to mix the reactants and allow the mixture to stand at room temperature for a period of time, followed by heating to a temperature of approximately 60° C. for a relatively short period of time.

However, the process is not restricted to the use of any definite heating time or temperature.

The reactants may be combined as such, or in solution form in a suitable solvent or solvents. Suitable solvents for this purpose include aromatic hydrocarbons, chlorinated solvents, esters, ethers, and the like.

4-methyl-Δ4-tetrahydrophthalic anhydride is obtained in good yields as a result of this reaction. The anhydride may be readily hydrolyzed to 4-methyl-Δ4-tetrahydrophthalic acid if desired as above pointed out.

Illustrative of one of the methods of preparation of 4-methyl-Δ4-tetrahydrophthalic anhydride is the following example:

*Example A*

A portion of an isoprene cut obtained by the fractionation of light oil, and containing 90 parts by weight of isoprene was mixed with 100 parts of maleic anhydride. This mixture was then dissolved in 260 parts of benzene, placed in an autoclave and allowed to stand for approximately 45 hours at room temperature. It was then heated to 60° C. for a period of 6 hours with agitation. At the end of this period it was cooled to 0° C. and filtered. There was obtained a mass of crystals corresponding to approximately 105 parts by weight. A further quantity of crystals, amounting to approximately 45 parts by weight was obtained by recrystallization from the filtrate. These crystals, totalling approximately 150 parts by weight, were found to be a highly purified form of 4-methyl-Δ4-tetrahydrophthalic anhydride.

*Ester formation*

Through the reaction of 4-metryl-Δ4-tetrahydrophthalic acid or its anhydride with alcohols, particularly the monohydric alcohols of the aliphatic series, there may be produced alkyl esters of the acid having properties which make such esters valuable in a number of industrial fields.

Among the alcohols which may be reacted with 4-methyl-Δ4-tetrahydrophthalic acid or its anhydride are the following: methyl alcohol, ethyl alcohol, normal propyl alcohol, secondary propyl alcohol, normal butyl alcohol, secondary butyl alcohol, isobutyl alcohol, tertiary butyl alcohol, normal amyl alcohol, $CH_3(CH_2)_3CH_2OH$, secondary butyl carbinol $CH_3 \cdot CH_2(CH_3)CHCH_2OH$, isoamyl alcohol $(CH_3)_2CHCH_2CH_2OH$, neopentyl alcohol $(CH_3)_3C \cdot CH_2OH$, pentanol-2 $(CH_3CH_2CH_2)(CH_3)CHOH$ pentanol-3-$(C_2H_5)_2CHOH$, methyl isopropyl carbinol $(CH_3)_2CHCHOHCH_3$, and tertiary amyl alcohol. In addition, any desired mixture of the foregoing alcohols, or any mixture of alcohols, containing one or more of the foregoing alcohols, may be used in the preparation of esters of 4-methyl-Δ4-tetrahydrophthalic acid: For example, a commercial mixture of amyl alcohols (pentasol) having the following approximate composition, secondary butyl carbinol—32%, N-amyl alcohol—26%, pentanol—3–18%, isomyl alcohol—16%, and pentanol—2–8%, has been found to be especially desirable for the production of these derivatives.

The esters obtained through such reactions theoretically have the following general formula.

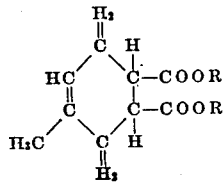

where one R represents an alkyl group and the other R represents a substituent selected from the group consisting of hydrogen and an alkyl group. It will be understood that when each R represents an alkyl group, the two alkyl groups need not be the same.

Disubstituted esters derived from each group of the above-named alcohols will have the following general formulae:

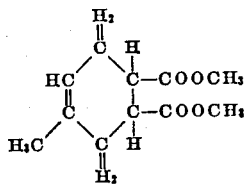

Methyl ester of 4-methyl-Δ4-tetrahydrophthalic acid.

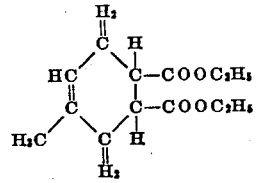

Ethyl ester of 4-methyl-Δ4-tetrahydrophthalic acid.

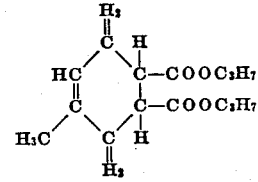

Propyl ester of 4-methyl-Δ4-tetrahydrophthalic acid, wherein $C_3H_7$ represents either of the two possible arrangements of the propyl radical.

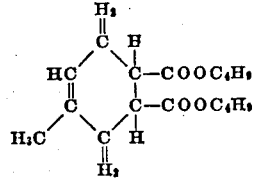

Butyl ester of 4-methyl-Δ4-tetrahydrophthalic acid, wherein $C_4H_9$ represents any of the four possible arrangements of the butyl radical, as indicated in my prior copending application.

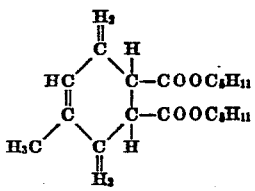

Amyl ester of 4-methyl-Δ4-tetrahydrophthalic acid, wherein C₅H₁₁ represents any of the eight possible arrangements of the amyl radical.

The alkyl esters of 4-methyl-Δ4-tetrahydrophthalic acid may be made in different ways.

One convenient way for the preparation of such esters is to react 4-methyl-Δ4-tetrahydrophthalic acid or its anhydride with the desired alcohol by heating the reacting constituents to the boiling point of the alcohol while employing a reflux condenser to return the vaporized alcohol to the still.

The reaction of alcohol and 4-methyl-Δ4-tetrahydrophthalic acid or anhydride results in the production of water and it is advisable to remove the water from the reaction.

This may be done in a number of ways.

For example, the mixed reactants may be heated to boiling, the vapors condensed, and the condensate permitted to stratify. The alcohol layer may be returned to the still and the water layer discarded or further processed to reclaim the small quantities of alcohol and ester which it may contain.

The continuous removal of the water formed during the reaction results in a considerable increase in the velocity of the esterification reaction and an increase in the yield of ester obtained from the process.

The removal of water formed during the reaction may be facilitated by the addition of a third component. A procedure which has been found very satisfactory is the following: a compound capable of forming an azeotropic mixture with water, and at the same time being sparingly soluble in water at room temperature, is added to the mixture of the alcohol and 4-methyl-Δ4-tetrahydrophthalic acid or its anhydride, and the ternary system so formed is heated to boiling. Benzene is suitable for use as such a compound. The vapors formed are condensed and permitted to stratify. The alcohol layer, namely, the upper layer, is returned to the still and the water layer is discarded, or subsequently processed to reclaim the small quantities of alcohol and ester which it may contain. This procedure may be employed in batch or continuous, or continual operations, or otherwise.

Another way to prepare the alkyl esters of 4-methyl-Δ4-tetrahydrophthalic acid involves the use of a catalyst which will facilitate the splitting off of water between the alcohol and the acid. Among the catalysts which may be employed, are sulfuric acid and anhydrous hydrogen chloride. When the latter is used, the mixture of alcohol and acid may be saturated with the dry hydrogen chloride, if desired.

The alkyl esters of 4-methyl-Δ4-tetrahydrophthalic acid may also be prepared through the reaction of the acid chloride of 4-methyl-Δ4-tetrahydrophthalic acid and the desired alcohol.

When this procedure is employed, it has been found that the use of another component capable of reacting to remove the liberated hydrogen chloride facilitates the preparation of the ester. Compounds which will act in this capacity without interfering with the main reaction are the amines, such as aniline, dimethyl aniline, methyl amine, ethyl amine, and ethanol amine, as well as organic bases in general, such as, for example, tetramethyl ammonium hydroxide.

In place of the alcohol, there may be used its metallic derivative, such as the corresponding sodium, potassium, or lithium alcoholate.

Generally speaking, in the process described herein, the reactants may be combined in any desired proportion, the excess of either component being separated from the reaction mass at the conclusion of the reaction by distillation or other suitable means.

The reactants may be mixed at the start of the reaction, or one of the components may be added to the other component during the course of the reaction. The reaction may be carried out batchwise, semi-continuously, continuously, continually, or otherwise and the reactants may be combined in a concurrent or countercurrent manner, or otherwise.

However, the use of at least approximately two moles of alcohol to one mole of the acid or the anhydride will be found to be advantageous from the standpoint of reaction speed and yield of ester.

If an acidic catalyst, such as sulfuric acid, has been employed, any acidity of the resultant product may be neutralized such as with sodium carbonate prior to separation of the ester, such as by vacuum distillation. In most cases, however, this neutralization step will be found to be unnecessary.

When mixtures containing one or more of the alcohols are used for the preparation of alkyl esters of 4-methyl-Δ4-tetrahydrophthalic acid, the mixture of esters so formed can be used as such, or they can be separated into their individual components by fractionation or by other suitable means. Among other methods, vacuum distillation may be utilized to isolate the pure individual esters from the mixture of alkyl esters.

Illustrative of the preparation of alkyl esters of 4-methyl-Δ4-tetrahydrophthalic acid by the above methods are the following examples:

*Example 1*

To a mixture of 83 parts by weight of 4-methyl-Δ4-tetrahydrophthalic anhydride, 80 parts by weight of methyl alcohol, and 22 parts by weight of benzene was added approximately 5 parts by weight of anhydrous hydrogen chloride. This mixture was refluxed for a period of approximately 24 hours. Following the refluxing period, the benzene and alcohol were removed by distillation, and the residual liquid was distilled in vacuo. There was thus obtained the dimethyl ester of 4-methyl-Δ4-tetrahydrophthalic acid in quantity equivalent to 73 parts by weight, representing 69% of the theoretical yield.

This ester had the following physical properties:

Boiling point, 134–144° C. at 5 mm.
Density D 20/4=1.1235
Refractive index N 20/D=1.4760

*Example 2*

To a mixture of 83 parts by weight of 4-methyl-Δ4-tetrahydrophthalic anhydride, 115 parts by weight of 95% ethyl alcohol, and 57 parts by weight of benzene, was added approximately 5 parts by weight of anhydrous hydrogen chloride.

This mixture was refluxed for a period of approximately 24 hours. Following the extended refluxing period, the benzene and unchanged alcohol were removed by distillation, and the residual liquid was distilled in vacuo. There was thus obtained a di-ethyl ester of 4-methyl-Δ4-tetrahydrophthalic acid in quantity equivalent to 89 parts by weight, representing 74% of the theoretical yield.

The crude ester so obtained was further fractionated in an efficient column under reduced pressure, resulting in the isolation of a more highly refined fraction of the desired ester.

This ester had the following physical properties:

Boiling point, 135–140 at 5 mm.
Density D 20/4=1.0816
Refractive index N 20/D=1.4680

Example 3

To a mixture of 115 parts by weight of absolute ethyl alcohol, 83 parts by weight of 4-methyl-Δ4-tetrahydrophthalic anhydride, and 27 parts by weight of benzene, was added approximately 5 parts by weight of anhydrous hydrogen chloride. This mixture was refluxed for a period of approximately 24 hours, after which the benzene and unchanged alcohol were removed by distillation. The residual liquid was then distilled in vacuo, resulting in the production of approximately 90 parts by weight of the diethyl ester of 4-methyl-Δ4-tetrahydrophthalic acid, representing 76% of the theoretical yield.

The ester so obtained was further fractionated in an efficient column under reduced pressure, resulting in the isolation of a more highly refined fraction of the desired ester. The ester obtained had properties similar to those listed in the preceding example.

Example 4

A mixture of 83 parts by weight of 4-methyl-Δ4-tetrahydrophthalic anhydride, 115 parts by weight of 95% ethyl alcohol, and 28 parts by weight of benzene was placed in a vessel equipped with a reflux condenser. The mixture was refluxed for a period of 15 hours, during which a stream of anhydrous hydrogen chloride was continuously passed through the reaction mixture.

The benzene and unchanged alcohol were removed by distillation under reduced pressure, after which the residual liquid also was distilled. Approximately 80 parts by weight of the diethyl ester of 4-methyl-Δ4-tetrahydrophthalic acid was obtained, representing 67% of the theoretical yield. The somewhat lower yield obtained was due to the accidental loss of a portion of the material during the course of the experiment.

The ester so obtained was further fractionated in vacuo. The refined ester obtained had properties similar to those listed in Example 2.

Example 5

To a mixture of 85 parts by weight of 4-methyl-Δ4-tetrahydrophthalic anhydride dissolved in benzene, there are added 185 parts by weight of normal butyl alcohol in which has been dissolved approximately 10 parts by weight of hydrogen chloride. This mixture is refluxed at a temperature, say between 135 and 145° C. for a period of approximately 15 hours.

The water generated during the reaction is preferably continuously removed, say by collecting the condensate in a trap, separating the layers, and returning the water-free reaction materials to the reaction zone. A quantity equivalent to approximately 16 parts by weight of water is removed during the course of the reaction.

Following the extended refluxing period, the benzene and alcohol are removed, say by distillation, and the residual liquid is fractionated in vacuo.

There is thus obtained a di-normal butyl ester of 4-methyl-Δ4-tetrahydrophthalic acid in quantity equivalent to approximately 135 parts by weight, representing approximately 92% of the theoretical yield.

This ester has the following physical properties:

Boiling point, 182–184.5° C. at 7–8 mm.
Density d 20/4—1.007
Refractive index n 20/D—1.4645

Example 6

A mixture comprising 85 parts by weight of 4-methyl-Δ4-tetrahydrophthalic anhydride, 185 parts by weight of normal butyl alcohol, 135 parts of benzene, and 2.5 parts of 95.5% sulfuric acid was refluxed at a temperature of approximately 140–150° C. for 45 hours.

Water was continuously removed from the condensate during the reaction in the manner described in Example 5.

After the refluxing had been discontinued, the benzene and alcohol were removed by distillation and the residue fractionated in vacuo.

There was obtained 125 parts by weight of the di-normal butyl ester of 4-methyl-Δ4-tetrahydrophthalic acid corresponding to a yield of 85% of the theoretical yield. This ester had the following properties:

Boiling point, 151.0–152.5° C. at 3–4 mm.
Density d 20/4=1.005
Refractive index n 20/D—1.4646

Examples 5 and 6 are taken from my prior copending application.

Example 7

To a mixture of 83 parts by weight of 4-methyl-Δ4-tetrahydrophthalic anhydride dissolved in benzene, there are added 220 parts by weight of normal amyl alcohol and 2½ parts by weight of sulfuric acid. This mixture is refluxed for a period of approximately 30 hours.

The water generated during the reaction is preferably continuously removed, say by collecting the condensate in a trap, separating the layers, and returning the water-free reaction materials to the reaction zone. A quantity equivalent to approximately 16 parts by weight of water is removed during the course of the reaction.

Following the extended refluxing period, the benzene and alcohol are removed, say by distillation, and the residual liquid is fractionated in vacuo.

There is thus obtained a di-normal amyl ester of 4-methyl-Δ4-tetrahydrophthalic acid in quantity equivalent to approximately 135 parts by weight, representing approximately 83% of the theoretical yield.

This ester has the following physical properties:

Boiling point, 176–190° C. at 5 mm.
Density d 20/4=0.9882
Refractive index n 20/D=1.4641

The propyl esters of 4-methyl-Δ4-tetrahydrophthalic acid may be prepared starting from the corresponding propyl alcohols by methods generally similar to those already given.

Any of the methods described herein may be employed in the preparation of the alkyl esters of 4-methyl-Δ4-tetrahydrophthalic acid. However, certain of the described procedures give better yields of the alkyl esters than others, depending upon the type of alcohol employed in the reaction.

For example, the reaction of tertiary butyl or tertiary amyl alcohol with 4-methyl-Δ4-tetrahydrophthalic acid can be effected by refluxing the reactants without the presence of any catalyst; the reaction, however, is somewhat slow and incomplete, and may be greatly accelerated by the addition of a catalyst. Sulphuric acid or hydrogen chloride may be added to assist in the removal of water formed by the reaction, and zinc dust may be added to catalyze the combination of the reactants.

A preferred method is the reaction of a metallic salt of 4-methyl-Δ4-tetrahydrophthalic acid, such as the sodium salt, with a tertiary butyl halide or derivative such as tertiary butyl chloride, or with a tertiary amyl halide or derivative, such as tertiary amyl chloride, suitably at elevated temperatures and pressures.

Similarly, the reaction of secondary butyl alcohol or of secondary amyl alcohol with 4-methyl-Δ4-tetrahydrophthalic acid may be accelerated through the use of a suitable catalyst, such as gaseous hydrogen chloride.

The production of secondary butyl esters or secondary amyl esters without the use of a catalyst is much slower than the production of primary butyl or primary amyl esters employing either normal butyl or amyl alcohol or isobutyl or isoamyl alcohol and using no catalyst.

In addition, a certain amount of rearrangement will be observed in the reaction of certain of the secondary butyl and amyl alcohols with 4-methyl-Δ4-tetrahydrophthalic acid, or its anhydride, or derivatives thereof.

The alkyl esters of 4-methyl-Δ4-tetrahydrophthalic acid are practically colorless and odorless fluids.

They may be used as plasticizers for cellulose acetate, cellulose nitrate, ethyl cellulose, natural gums, synthetic resins, and resinous and plastic materials in general.

They may be applied in combination with other plasticizers in the formulation of plastics, including lacquers, particularly those lacquers containing cellulose esters and ethers. They are particularly valuable as plasticizers for lacquer films. They may be used as plasticizers and softening agents for resins, plastics, and gums which are to be molded, extruded, cast, or formed by any of the methods known to the art. They also are valuable as intermediates in chemical syntheses.

Exemplary of their industrial utility is their use in the preparation of lacquer plasticizers. For this purpose, it is sometimes desirable to employ substances possessing a fairly wide range in plasticizing characteristics. Mixed butyl esters of 4-methyl-Δ4-tetrahydrophthalic acid such as are obtained by the reaction of mixtures containing butyl alcohols with the acid or its anhydride, are particularly adapted to meet the requirements for such lacquer plasticizers. Similarly, mixed amyl esters may be prepared and utilized. The use of these various alkyl esters in combination with other esters, such as those derived from maleic acid or phthalic acid, also will be found to be desirable in certain cases. Two or more alkyl esters of 4-methyl-Δ4-tetrahydrophthalic may likewise be used in combination, where desired.

On the other hand, it is often desirable to make use of substances having a fairly narrow boiling range. Butyl esters of 4-methyl-Δ4-tetrahydrophthalic acid or its anhydride, which have been prepared through the reaction of a single butyl alcohol with the acid or anhydride, meet the requirements for such a substance. The same is true of single propyl esters and single amyl esters using a single propyl or amyl alcohol.

The use of the alkyl esters of 4-methyl-Δ4-tetrahydrophthalic acid as plasticizing agents is illustrated by the following examples:

*Example 8*

A mixture of the following basic ingredients:

| | Parts |
|---|---|
| Ester gum | 2.5 |
| Nitrocellulose (½ second) | 5 |
| Dimethyl ester of 4-methyl-Δ4-tetrahydrophthalic acid | 2.5 | was incorporated in 40 parts of a thinner of the following composition

| | Parts |
|---|---|
| Amyl alcohol | 10 |
| Isopropyl acetate | 13 |
| Anhydrous ethyl alcohol | 3 |
| Toluol | 34 |
| "Troluol" | 20 |
| Pentacetate | 20 |

("Troluol" is a hydrocaron solvent well known in the art. It is a mixture of hydrocarbons derived from the cracking of petroleum oil under conditions such as are employed in making motor fuel, and is predominantly non-aromatic in character with boiling range characteristics essentially similar to those of toluol.)

A clear, somewhat viscous solution was obtained. This lacquer was applied to the surface of tin panels and permitted to dry overnight. An adherent extensible, flexible film was found, which did not silk or crack when the tin panel was repeatedly bent through an angle of 180°.

*Example 9*

A mixture of the following basic ingredients

| | Parts |
|---|---|
| Cellulose acetate | 6.5 |
| Methyl ester of 4-methyl-Δ4-tetrahydrophthalic acid | 0.5 | was dissolved in 93 parts of a thinner of the following composition

| | Parts |
|---|---|
| Acetone | 50 |
| Ethylene glycol monomethyl ether | 20 |
| Toluene | 15 |
| Isoprene acetate | 15 |

A clear, somewhat viscous solution was obtained. This was used to coat several metal panels which were subsequently permitted to dry overnight. A colorless, adherent, extensible film was formed. It did not silk or crack when the panel was repeatedly bent over a ⅛" mandrel through an angle of 180°.

*Example 10*

Approximately 5 parts of ester gum, 10 parts of ethyl cellulose, and 5 parts of the methyl ester of 4-methyl-Δ4-tetrahydrophthalic acid was dissolved in 80 parts of a thinner having the following composition

| | Parts |
|---|---|
| Pentasol | 10 |
| Pentacetate | 20 |
| Isopropyl acetate | 13 |
| Ethyl alcohol (anhydrous) | 3 |
| Toluol | 34 |
| "Troluol" | 20 |

A clear, viscous solution was obtained, which was subsequently applied to the surface of tin panels. A tough, adherent, extensible film was obtained.

Example 11

A mixture of the following basic ingredients

| | Parts |
|---|---|
| Ester gum | 2.5 |
| Nitrocellulose (½ second) | 5 |
| Diethyl ester of 4-methyl-Δ4-tetrahydrophthalic acid | 2.5 | was incorporated in 40 parts of a thinner of the following composition

| | Parts |
|---|---|
| Amyl alcohol | 10 |
| Isopropyl acetate | 13 |
| Anhydrous ethyl alcohol | 3 |
| Toluol | 34 |
| "Troluol" | 20 |
| Pentacetate | 20 |

A clear, somewhat viscous solution was obtained. This lacquer was applied to the surface of tin panels and permitted to dry overnight. An adherent extensible, flexible film was found, which did not silk or crack when the tin panel was repeatedly bent through an angle of 180°.

Example 12

A mixture of the following basic ingredients

| | Parts |
|---|---|
| Cellulose acetate | 6.5 |
| Ethyl ester of 4-methyl-Δ4-tetrahydrophthalic acid | 0.5 | was dissolved in 93 parts of a thinner of the following composition:

| | Parts |
|---|---|
| Acetone | 50 |
| Ethylene glycol monomethyl ether | 20 |
| Toluene | 15 |
| Isoprene acetate | 15 |

A clear, somewhat viscous solution was obtained. This was used to coat several metal panels which were subsequently permitted to dry overnight. A colorless, adherent, extensible film was formed. It did not silk or crack when the panel was repeatedly bent over a ⅛" mandrel through an angle of 180°.

Example 13

Approximately 5 parts of ester gum, 10 parts of ethyl cellulose, and 5 parts of the ethyl ester of 4-methyl-Δ4-tetrahydrophthalic acid was dissolved in 80 parts of a thinner having the following composition

| | Parts |
|---|---|
| Pentasol | 10 |
| Pentacetate | 20 |
| Isopropyl acetate | 13 |
| Ethyl alcohol (anhydrous) | 3 |
| Toluol | 34 |
| "Troluol" | 20 |

A clear, viscous solution was obtained, which was subsequently applied to the surface of tin panels. A tough, adherent, extensible film was obtained.

Example 14

A mixture of the following basic ingredients

| | Parts |
|---|---|
| Ester gum | 2.5 |
| Nitrocellulose (½ second) | 5 |
| 4-methyl-Δ4-tetrahydrophthalic acid n-amyl ester | 2.5 | was incorporated in 40 parts of a thinner of the following composition

| | Parts |
|---|---|
| Butyl alcohol | 10 |
| Isopropyl acetate | 13 |
| Anhydrous ethyl alcohol | 3 |
| Toluol | 34 |
| "Troluol" | 20 |
| Pentacetate | 20 |

A clear, somewhat viscous solution was obtained. This lacquer was applied to the surface of tin panels and permitted to dry overnight. An adherent, extensible, flexible film was formed, which did not silk or crack when the tin panel was repeatedly bent through an angle of 180°.

Example 15

A mixture of the following basic ingredients

| | Parts |
|---|---|
| Cellulose acetate | 6.5 |
| 4-methyl-Δ4-tetrahydrophthalic acid n-amyl ester | 0.5 | was dissolved in 93 parts of a thinner of the following composition

| | Parts |
|---|---|
| Acetone | 50 |
| Ethylene glycol monomethyl ether | 20 |
| Toluene | 15 |
| Isoprene acetate | 15 |

A clear, somewhat viscous solution was obtained. This was used to coat several metal panels which were subsequently permitted to dry overnight. A colorless, adherent, extensible film was formed. It did not silk or crack when the panel was repeatedly bent over a ⅛" mandrel through an angle of 180°.

Example 16

Approximately 5 parts of ester gum, 10 parts of ethyl cellulose, and 5 parts of the N-amyl ester of 4-methyl-Δ4-tetrahydrophthalic acid was dissolved in 80 parts of a thinner having the following composition

| | Parts |
|---|---|
| Pentasol | 10 |
| Pentacetate | 20 |
| Isopropyl acetate | 13 |
| Ethyl alcohol (anhydrous) | 3 |
| Toluol | 34 |
| "Troluol" | 20 |

A clear, viscous solution was obtained, which was subsequently applied to the surface of tin panels. A tough, adherent, extensible film was obtained.

Plastics, resins, and resinous masses in general may be plasticized by the use of alkyl esters of 4-methyl-Δ4-tetrahydrophthalic acid, either alone or in admixture with other plasticizing agents or solvents. Illustrative of such resins and plastics are the following: cellulose acetate, cellulose nitrate, ethyl cellulose, cellulose acetobutyrate, polyvinyl chloride, polyvinyl acetate, polyvinyl chloride-polyvinyl acetate co-polymers, polyvinyl acetal, polymerized acrylic acid, acrylic acid esters, or acrylic nitrile, polymerized methacrylic acid, methacrylic acid esters, or methacrylic nitrile, polyvinyl esters, hydrocarbon resins, polystyrene, polymethyl styrene, polyamide-polybasic acid plastic masses, and the like. Copolymers obtained by the polymerization of two or more of the foregoing compounds also may be plasticized by the use of alkyl esters of 4-methyl-Δ4-tetrahydrophthalic acid.

For certain uses, such as for lacquer plasticizing agents, it has been found advantageous in certain cases to use a mixture of the ester with a small quantity of the corresponding alcohol in order to neutralize any acidity which may be formed as the result of a slight hydrolysis of the ester.

My new alkyl esters may be employed for many purposes.

For example, they may be employed (1) as solvents for synthetic and natural gums, plastics, and resins; (2) as ingredients in the preparation of lacquers, spirit varnishes, oil varnishes, enamels, paints, and coating compositions generally; (3) as plasticizers for natural gums and resins such as shellac, congo, kauri, sandarac, elemi, copal, dammar, casein, and rosin; (4) as plasticizers for synthetic resins such as ester gum, cummarone resins, vinyl resins, phenol-aldehyde resins, urea-aldehyde resins, acrylate resins, methacrylate resins, hydrocarbon resins, polystyrene resins, and indene resins; (5) as plasticizers for cellulosic plastics such as cellulose nitrate, ethyl cellulose, and cellulose acetate; and (6) as plasticizers for lacquer films.

The invention in its broadest aspects also includes the preparation of the monoalkyl esters of 4-methyl-Δ4-tetrahydrophthalic anhydride. As an example, monoalkyl esters may be obtained as intermediates in the reactions in the foregoing examples by stopping the reactions before completion and separating the monoalkyl and dialkyl esters by fractionation.

In general, these compounds are of less importance industrially than the corresponding dialkyl esters. However, they have certain applications, as for example, the preparation of mixed esters by reaction with another alcohol, such as for example, by reacting the monobutyl ester with N-amyl alcohol, or by reacting the mono-amyl ester with N-butyl alcohol, etc.

It will be understood that my invention embraces alkyl esters of 4-methyl-Δ4-tetrahydrophthalic acid broadly, and particularly the alkyl esters of one to five carbon atoms in each alkyl radical thereof.

In the process claims, the term "4-methyl-Δ4-tetrahydrophthalic acid" is intended to embrace the acid, or its anhydride, or mixtures of the same.

In the product claims, reference to the acid is merely by way of appellation of the final product regardless of how made, and is therefore not intended to be limitative as to any method employed for the production of the esters claimed herein.

While organic esters of particular types and procedures for the purpose of preparing such esters have been particularly described, it is to be understood that this is by way of illustration. Therefore, changes, omissions, additions, substitutions and/or modifications may be made within the scope of the claims without departing from the spirit of the invention.

I claim:

1. An alkyl ester of 4-methyl-Δ4-tetrahydrophthalic acid; wherein each alkyl radical contains not more than five carbon atoms.

2. Dimethyl ester of 4-methyl-Δ4-tetrahydrophthalic acid.

3. Diethyl ester of 4-methyl-Δ4-tetrahydrophthalic acid.

4. Diamyl ester of 4-methyl-Δ4-tetrahydrophthalic acid.

5. A process which comprises reacting 4-methyl-Δ4-tetrahydrophthalic acid with methyl alcohol.

6. A process which comprises reacting 4-methyl-Δ4-tetrahydrophthalic acid with ethyl alcohol.

7. A process which comprises reacting 4-methyl-Δ4-tetrahydrophthalic acid with amyl alcohol.

8. An alkyl ester of 4-methyl-Δ4-tetrahydrophthalic acid corresponding to the formula:

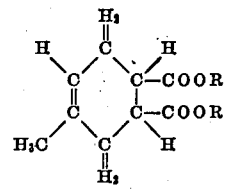

where one R represents an alkyl group, and the other R represents a substituent selected from the group consisting of hydrogen and an alkyl group.

9. A process which comprises reacting 4-methyl-Δ4-tetrahydrophthalic acid with a saturated aliphatic alcohol in the presence of sulfuric acid.

10. A process which comprises reacting 4-methyl-Δ4-tetrahydrophthalic acid with a saturated aliphatic alcohol in the presence of anhydrous hydrogen chloride.

11. A process which comprises reacting 4-methyl-Δ4-tetrahydrophthalic acid with a saturated aliphatic alcohol in the presence of benzene; the presence of said benzene facilitating separation from the reaction zone of water formed during the reaction.

12. A dialkyl ester of 4-methyl-Δ4-tetrahydrophthalic acid.

13. A process which comprises reacting 4-methyl-Δ4-tetrahydrophthalic acid with a saturated aliphatic alcohol.

FRANK J. SODAY.